(12) United States Patent
Yang et al.

(10) Patent No.: US 6,440,198 B1
(45) Date of Patent: Aug. 27, 2002

(54) COST EFFECTIVE MOVING GRANULAR BED FILTERS FOR PARTICULATES AND CONTAMINANTS REMOVAL

(75) Inventors: Wen-Ching Yang, Export; Richard A. Newby, Pittsburgh, both of PA (US)

(73) Assignee: Siemens Westinghouse Power Corporation, Orlando, FL (US)

(*) Notice: Subject to any disclaimer, the term of this patent is extended or adjusted under 35 U.S.C. 154(b) by 50 days.

(21) Appl. No.: 09/711,018

(22) Filed: Nov. 9, 2000

(51) Int. Cl.$^7$ ................................................ B01D 39/02
(52) U.S. Cl. ........................... 95/275; 95/276; 55/353; 96/150; 96/152
(58) Field of Search ..................... 95/274, 275, 276; 55/353, 351, 479; 96/123, 150, 152

(56) References Cited

U.S. PATENT DOCUMENTS

| | | | |
|---|---|---|---|
| 3,220,165 A | * 11/1965 | Howie | ........................... 55/474 |
| 3,716,969 A | 2/1973 | Maeda | |
| 3,940,237 A | * 2/1976 | Gonzalez et al. | .............. 34/82 |
| 3,960,529 A | 6/1976 | Juntgen et al. | |
| 4,012,210 A | 3/1977 | Morris | |
| 4,443,419 A | 4/1984 | Carson | |
| 4,880,608 A | 11/1989 | Stelman | |
| 5,653,181 A | 8/1997 | Yang et al. | |

FOREIGN PATENT DOCUMENTS

JP          58114711 A   *   7/1983

* cited by examiner

*Primary Examiner*—Robert A. Hopkins

(57) ABSTRACT

A moving granular bed filter for removing contaminants from a gas or vapor stream employs a quantity of granular media that is passed through a vessel while the contaminant-laden gas stream is passed through the granular media to remove at least a portion of the contaminants from the gas stream and into the granular media. The vessel includes a media inlet that extends between a pair of opposite regions of the vessel and delivers the granular media into the interior of the vessel such that the granular media forms a freely-formed filtration pile within the interior of the vessel to define first and second chambers above the upper surface of the pile and on opposite sides of the media inlet. In one embodiment, the media inlet is disposed at the lower end of a media delivery channel that extends downwardly into the interior of the vessel and which supplies the granular media to the media inlet. In the same embodiment, the vessel additionally includes a gas flow direction plate disposed within the media and extending between the pair of opposite regions of the vessel to direct the flow of the gas stream both concurrent and then counter-current with the flow of the granular media through the vessel. In another embodiment, the vessel does not include the gas flow direction plate. In still another embodiment, the media delivery channel may include a flared skirt that forms the media inlet. The abstract shall not be used for interpreting the scope of the claims.

20 Claims, 4 Drawing Sheets

COST EFFECTIVE MOVING GRANULAR BED FILTERS FOR PARTICULATES AND CONTAMINANTS REMOVAL

BACKGROUND OF THE INVENTION

1. Field of the Invention

The present invention relates generally to devices for removing contaminants from a gas or vapor stream and, more particularly, to a moving granular bed filter for removing contaminants from a gas or vapor stream.

2. Description of the Related Art

The removal of contaminant materials from a gas or vapor stream is required in numerous diverse applications. For instance, fly ash must be removed from the exhaust gas stream of a coal-fired powerplant in order to meet applicable pollution regulations. As another example, sulfur dioxide gas is also preferably removed from the same exhaust stream from the coal-fired powerplant. Other examples include any process in which a gas or vapor reacts with a solid, such as in a fluidized bed reaction vessel of a chemical process or in a catalytic process at a petroleum refinery. In short, numerous processes and applications involve the undesirable entrainment of a particulate or other contaminant within a gas or stream, which contaminant is preferably removed for various purposes. Among the purposes for which entrained contaminants are removed from a gas stream include the meeting of environmental regulations concerning the contaminants borne in an exhaust gas stream, the recovery of gas-borne materials for sale or reuse, as well as for other purposes.

Among the known devices employed in removing contaminants from a gas or vapor stream are the electrostatic precipitator (ESP), the cyclone device which operates as a centrifuge, and the bag house. While these three device can be operated either at low pressures or high pressures, such devices typically can operate only at relatively low temperatures. The requirement of low temperature operation limits the applicability of these devices inasmuch as numerous chemical processes and power generation operations involve high temperature applications.

Another contaminant removal device is the moving granular bed filter, which employs a moving bed of granular media to remove contaminants from a gas or vapor stream. Such moving granular bed filters have been successfully employed in high temperature, high pressure applications. Nevertheless, the cost of such moving granular bed filters has been relatively high since the vessels most typically are of a cylindrical configuration to withstand the high pressures involved in the application. It is thus desired to provide a moving granular bed filter suitable for use in high temperature, low pressure applications and that can be economically manufactured.

Since moving granular bed filters operate by capturing or trapping gas or vapor-borne contaminants within the granular media, it is understood that such filter a typically cannot remove 100% of any given contaminant in one filtering operation and, depending upon the application, it is thus often necessary to pass the gas through multiple moving granular bed filters that may employ different granular media or the same type of granular media but of a different particle size to progressively remove incremental amounts of the contaminants from the gas stream. It is thus desired to provide a moving granular bed filter that can easily be connected in a series and/or parallel relation with other such moving granular bed filters in a filtration operation.

Since the granular media and the gas stream typically are both moving simultaneously through the vessel of the moving granular bed filter, different filtration effects can be achieved depending upon whether the granular media and the gas stream are moving together in generally the same direction (concurrent flow) or are moving against one another in opposite directions (counter-current flow). It is thus desired to provide a moving granular bed filter that can induce both concurrent and counter-current flow in the same vessel in order to maximize capture of the contaminants from the gas or vapor stream.

SUMMARY OF THE INVENTION

In accordance with the foregoing, a moving granular bed filter for removing contaminants from a gas or vapor stream employs a quantity of granular media that is passed through a vessel while the contaminant-laden gas stream is passed through the granular media to remove at least a portion of the contaminants from the gas stream and into the granular media. The vessel includes a media inlet that extends between a pair of opposite regions of the vessel and delivers the granular media into the interior of the vessel such that the granular media forms a freely-formed pile within the interior of the vessel to defame first and second chambers above the upper surface of the pile and on opposite sides of the media inlet. In one embodiment, the media inlet is disposed at the lower end of a media delivery channel that extends downwardly into the interior of the vessel and which supplies the granular media to the media inlet. In the same embodiment, the vessel additionally includes a gas flow direction plate disposed within the media and extending between the pair of opposite regions of the vessel to direct the flow of the gas stream both concurrent and then counter-current with the flow of the granular media through the vessel. In another embodiment, the vessel does not include the gas flow direction plate. In still another embodiment, the media delivery channel may include a flared skirt that forms the media inlet.

An objective of the present invention is to provide a reduced-cost moving granular bed filter.

Another objective of the present invention is to provide a moving granular bed filter that can be employed in high temperature applications.

Another objective of the present invention is to provide a moving granular bed filter that can be employed in low pressure applications.

Another objective of the present invention is to provide a moving granular bed filter that can be constructed inexpensively by manufacture primarily out of common channel and plate members and that generally does not require special fabrication techniques apart from welding.

Another objective of the present invention is to provide a moving granular bed filter in which multiples of the filter can easily be connected in a series and/or parallel configuration.

Another objective of the present invention is to provide a moving granular bed filter in which the gas stream experiences both concurrent and counter-current flow with respect to the movement of the granular media through the vessel.

Another objective of the present invention is to provide a moving granular bed filter that employs a pile of granular media which can be configured to provide in various degrees both concurrent and counter-current flow of the gas stream with respect to the moving granular media.

An aspect of the present invention thus is to provide a moving granular bed filter for removing contaminants from a gas stream with a quantity of granular media, the general nature of which can be stated as including a vessel having a wall structure and being formed with a hollow interior, with the vessel including a gas inlet, a gas outlet, a media inlet, and a media outlet in communication with the interior. In such a moving granular bed filter, the media inlet extends between a pair of opposed regions of the wall structure and is structured to supply the granular media to the interior of the vessel. The granular media forms in a freely-formed filtration pile within the interior of the vessel, with the filtration pile having an upper surface, and the filtration pile extending between the media inlet and the media outlet and extending between the pair of opposed regions of the wall structure to define a first chamber and a second chamber within the interior. The first and second chambers each extend from the upper surface of the filtration pile, with the first chamber extending between a first side of the media inlet and the wall structure, and the second chamber extending between a second opposite side of the media inlet and the wall structure. The gas inlet is in communication with the first chamber, the gas outlet is in communication with the second chamber, and the filtration pile of granular media is operatively interposed between the first and second chambers.

Another aspect of the present invention is to provide a moving granular bed filter for removing contaminants from a gas stream with a quantity of granular media, the general nature of which can be stated as including a vessel having a wall structure and a roof connected with one another, and the vessel being formed with a hollow interior defined between the wall structure and the roof. The vessel includes a gas inlet, a gas outlet, a media inlet, and a media outlet in communication with the interior. The vessel further includes a media delivery channel extending partially into the interior of the vessel and terminating at the media inlet, the media delivery channel including a first media direction plate and a second media direction plate that each extend between a pair of opposed regions of the wall structure. The media inlet is structured to supply the granular media from the media delivery channel to the interior of the vessel to form a freely-formed filtration pile within the interior of the vessel, the filtration pile having an upper surface and extending between the media inlet and the media outlet and between the pair of opposed regions of the wall structure to define a first chamber and a second chamber within the interior. The first and second chambers each extend from the upper surface of the filtration pile, with the first chamber extending between the first media direction plate and the wall structure, and the second chamber extending between the second media direction plate and the wall structure. The gas inlet is in communication with the first chamber, the gas outlet is in communication with the second chamber, and the filtration pile of granular media is operatively interposed between the first and second chambers.

Still another aspect of the present invention is to provide a method of removing contaminants from a gas stream using a quantity of granular media within a moving granular bed filter, the general nature of which can be stated as including the steps of maintaining a freely-formed filtration pile of the granular media within the interior of a vessel of the moving granular bed filter, flowing the gas stream including the contaminants from the exterior of the vessel through a gas inlet into a first chamber, passing the gas stream through the filtration pile to remove at least a portion of the contaminants from the gas stream, and discharging the gas stream into a second chamber and through a gas outlet to the exterior of the vessel. In employing such a method, the filtration pile extends between a pair of opposed regions of a wall structure of the vessel and between a media inlet and a media outlet to define the first and second chambers within the interior of the vessel. The first and second chambers each extend upwardly from the upper surface of the filtration pile on opposite sides of the media inlet, and the media inlet and the media outlet are in communication with the exterior of the vessel.

BRIEF DESCRIPTION OF THE DRAWINGS

A further understanding of the invention can be gained from the following description of the preferred embodiments when read in conjunction with the accompanying drawings in which.

Similar numerals refer to similar parts throughout the specification.

DESCRIPTION OF THE PREFERRED EMBODIMENTS

Figure 1:
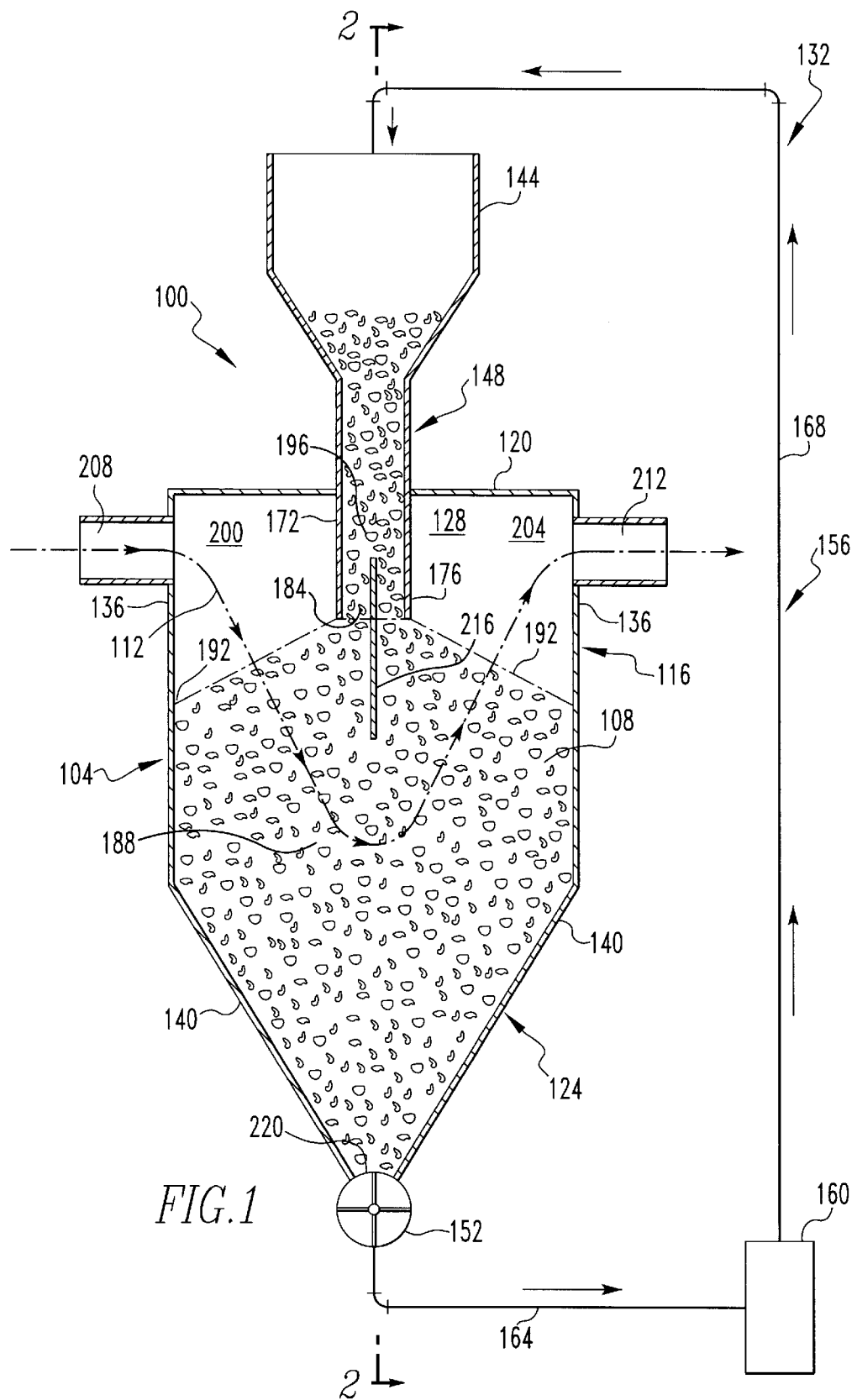
FIG. 1 is a front elevational view, partially cut away, of a first embodiment of a moving granular bed filter in accordance with the present invention and depicting a quantity of granular media disposed therein.
Figure 2:
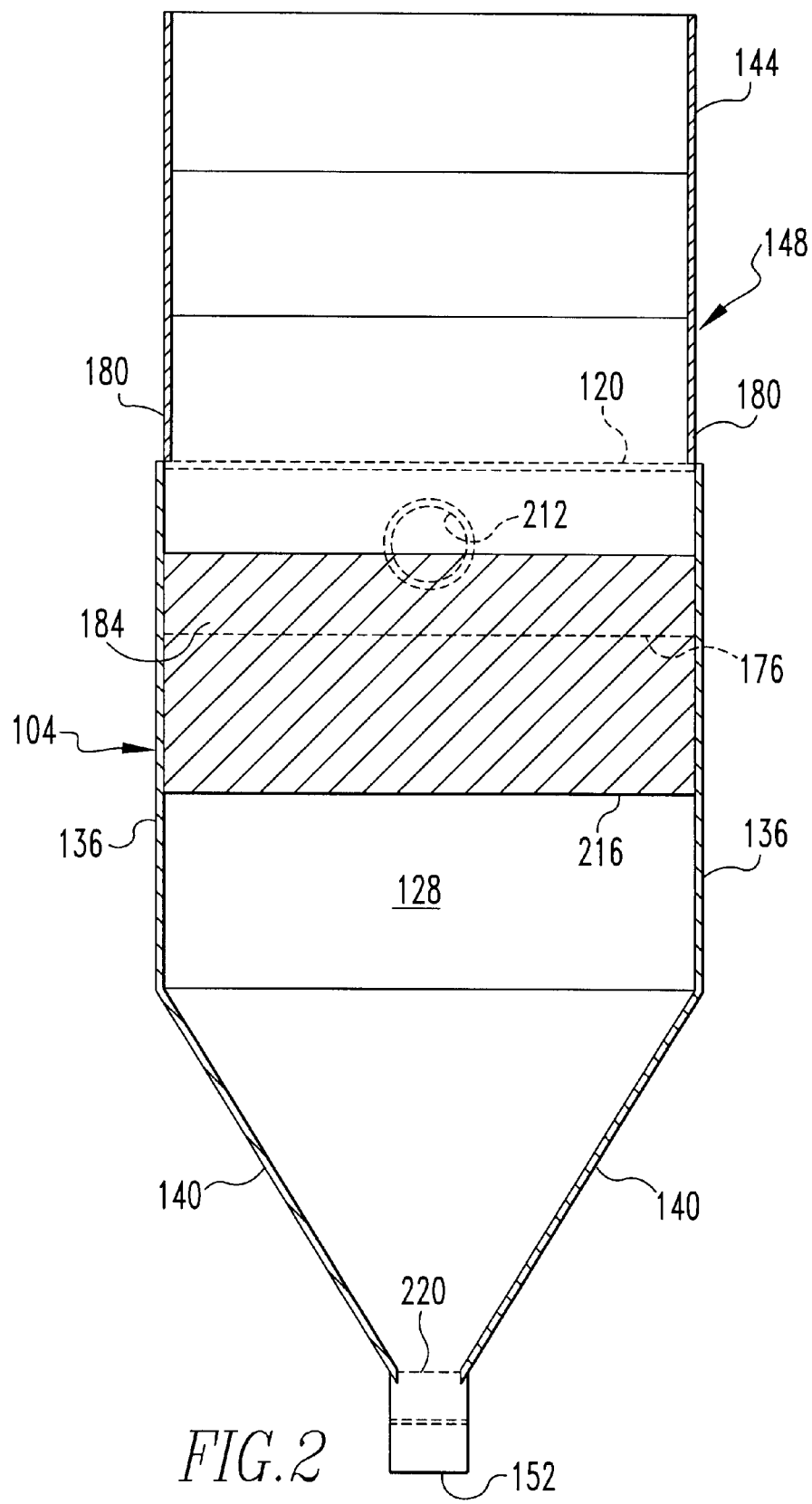
FIG. 2 is a sectional view as taken along line 2—2 of FIG. 1, with the granular media removed for purposes of clarity.

A moving granular bed filter 100 in accordance with the present invention is indicated generally in FIGS. 1 and 2. The moving granular bed filter 100 can be broadly described as including a vessel 104 through which a quantity of granular media 108 moves and through which flows a gas stream (indicated generally by the arrows 112) having a quantity of contaminants entrained therein is cleaned of at least a portion of the contaminants by the granular media 108. The gas stream 112 can be any gas, vapor, or combination of gases and/or vapors having one or more contaminants or undesirable material entrained therein. The contaminants can include any solid material (such as a particulate material) or any gas or vapor that is desired to be removed from the gas stream 112. The granular media 108 can be any of a wide variety of granular solid materials that are suited to remove one or more of the contaminants from the gas stream 112, as will be set forth more fully below.

The vessel 104 includes a wall structure 116 connected with a roof 120 and a funnel-shaped base 124 to define an interior 128. A granular media delivery system 132 is disposed at the exterior of the vessel 104 and is in communication with the interior 128 of the vessel 104. The granular media delivery system 132 continuously or periodically moves the granular media 108 through the interior 128 of the vessel 104 by delivering substantially contaminant-free granular media 108 to the interior 128 of the vessel 104 and by removing from the interior 128 the granular media 108 which carries the contaminants that have been removed from the gas stream 112. The granular media delivery system 132 preferably operates as a closed-looped system whereby the granular media 108 is reused after a cleaning operation, although this is not strictly necessary to achieve the beneficial aspects of the present invention.

In the example of the vessel 104 depicted in FIGS. 1 and 2, the wall structure 116 includes four generally planar walls 136 that are connected with one another to form a polygon, and that are each connected at the upper end thereof with a generally planar plate that forms the roof 120. The example shown in FIGS. 1 and 2 additionally show the funnel-shaped base 124 as being constructed out of a plurality of roughly triangular and generally planar plates 140 that extend downwardly from the ends of the walls 136 opposite the roof 120 to form roughly an upside-down right rectangular pyramid connected with the wall structure 116. It will be understood, however, that other configurations for the wall structure 116, the roof 120, and the funnel-shaped based 124 are possible without departing from the concept of the present invention.

The granular media delivery system 132 that is schematically depicted in FIG. 1, includes a hopper 144 connected with a media delivery channel 148 mounted on the roof 120 of the vessel 104, a valve 152 mounted at the generally vertically lowest point of the funnel-shaped base 124, and a media transport system 156 operatively extending between the valve 152 and the hopper 144. The media transport system 156 includes a media cleaning system 160 that is operatively connected with the valve 152 by a first media transport mechanism 164, and is connected with the hopper 144 by a second media transport mechanism 168.

The first and second media transport mechanisms 164 and 168 can be any of a wide variety of known material handling systems such as pneumatic transport systems, conveyer belts, bucket conveyors, screw conveyors, and other such systems. The media cleaning system 160 can be any of a variety of known systems for removing from the granular media 108 the contaminants that have been removed from the gas stream 112, such as seiving mechanisms, regeneration systems, heating systems, washing systems, and other types of cleaning systems that are appropriate for use with the granular media 108 and for removal of the specific contaminant therefrom. It is understood that the media transport system 156 is depicted schematically in FIG. 1, and that other configurations are possible in which one or more of the aforementioned components of the media transport system 156 may be absent, or additional components may be added thereto, without departing from the concept of the present invention. Broadly stated, the granular media delivery system 132 removes contaminant-laden granular media 108 from the interior 128 of the vessel 104, removes the contaminants from the granular media 108, and returns the cleaned granular media 108 to the interior 128 of the vessel 104.

As can be seen from FIGS. 1 and 2, the media delivery channel 148 extends from the hopper 144 into the interior 128 of the vessel 104, and advantageously extends between opposite walls 136 (FIG. 2) of the wall structure 116. Since the wall structure 116 is depicted in FIGS. 1 and 2 as being of an approximately square and hollow cross-section, the media delivery channel 148 extends between the midpoints of opposite walls 136, although it is understood that if the wall structure 116 is other than square, such as if the wall structure 116 were of other polygonal shapes or curved profiles, it could be generally stated that the media delivery channel 148 extends between opposed regions of the wall structure 116.

The media delivery channel 148 is of a hollow, approximately rectangular cross-section and includes a first media direction plate 172 and a second media direction plate 176 (FIG. 1) that are substantially planar and generally parallel and spaced apart and are connected with one another by side plates 180 (FIG. 2) extending between the side edges thereof to form a generally rectangular channel. Inasmuch as the media delivery channel 148 is depicted in FIGS. 1 and 2 as extending both above and below the roof 120, it is understood that the side plates 180 must extend at least between the portions of the first and second media direction plates 172 and 176 that protrude above the roof 120, but that the side plates 180 need not extend below the roof 120 inasmuch as the side edges of the first and second media direction plates 172 and 176 can be connected directly with the opposite walls 136 to define the generally rectangular cross-section of the media delivery channel 148 within the interior 128 of the vessel 104.

The granular media 108 flows from the hopper 144 through the media delivery channel 148, and out of a media inlet 184, which is the open end of the media delivery channel 148 opposite the hopper 144. The granular media 108 flows out of the media inlet 184 and forms a freely-formed filtration pile 188 within the interior 128 of the vessel 104 and having an upper surface that is depicted by the dashed line 192. The media inlet 184 thus is in communication with the interior 128 as well as the exterior of the vessel 104 and is the passage through which the granular media 108 is delivered into the interior 128 of the vessel 104.

As is known in the relevant art, the granular media 108 forms itself into piles according to a static angle of repose that is possessed by and is particular to the granular media 108. The static angle of repose of the granular media 108 dictates the angle with respect to the horizontal at which the upper surface 192 of the filtration pile 188 will be oriented with respect to the horizontal. As such, the granular media 108 flows out of the media inlet 184 into the interior 128 of the vessel 104 and forms the filtration pile 188, with the upper surface 192 of the filtration pile 188 being oriented at the static angle of repose of the granular media 108 with respect to the horizontal.

When the filtration pile 188 extends fully between the valve 152 and the media inlet 184, the granular media 108 ceases to flow into the interior 128 of the vessel 104 until a quantity of the granular media 108 is removed from the filtration pile 188, such as when the valve 152 operates to remove a portion of the granular media 108 from the vessel 108 and deliver it to the first media transport mechanism 164, after which additional granular material 108 may flow from the media inlet 184 into the interior 128. It is preferred that a sufficient quantity of the granular media 108 be disposed in the media delivery channel 148 and the hopper 144 such that the granular media 108 forms a delivery pile 196 within the delivery channel 148 that is disposed immediately above and in communication with the filtration pile 188. With such a configuration, the granular media 108 forms the filtration pile 188 within the interior 128 of the vessel 104 that extends between the valve 152 and the media inlet 184 and that has the upper surface 192 according to the static angle of repose, with additional granular media 108 being disposed in the delivery pile 196 within the media delivery channel 148 above and in communication with the filtration pile 188.

Since the media delivery channel 148 extends between a pair of opposed regions of the wall structure 116, and since the filtration pile 188 extends between the valve 152 and the media inlet 184, the filtration pile 188 separates the interior 128 of the vessel 104 into a first chamber 200 and a second chamber 204 that each extend above the upper surface 192 of the filtration pile and are disposed on opposite sides of the media delivery channel 148.

As is best shown in FIG. 1, the first chamber 200 extends vertically between the upper surface 192 of the filtration pile 188 and the roof 120, and extends horizontally between the first media direction plate 172 and the wall structure 116.

Similarly, the second chamber 204 extends vertically between the upper surface 192 of the filtration pile 188 and the roof 120, and extends horizontally between the second media direction plate 176 and the wall structure 116. It can further be seen that the first and second chambers 200 and 204 are not in direct communication with one another. Rather, the filtration pile 188 is operatively interposed between the first and second chambers 200 and 204.

As can further be seen from FIG. 1, the vessel 104 additionally includes a gas inlet 208 that extends from the exterior of the vessel 104 and is in communication with the first chamber 200. Similarly, the vessel 104 includes a gas outlet 212 that extends from the exterior of the vessel 104 and is in communication with the second chamber 204. While the gas inlet and outlet 208 and 212 are depicted as extending through opposite walls 136 of the wall structure 116 to be in communication with the interior 128 of the vessel 104, it is understood that the gas inlet and outlet 208 and 212 can alternately extend through holes formed in the roof 120, and depending upon the configuration of the vessel 104 could themselves provide the roof 120.

As can be understood from FIG. 1, the gas stream having the contaminants entrained therein is delivered through the gas inlet 208 and into the first chamber 200 within the interior 128 of the vessel 104. As is indicated by the arrows 112, the gas stream then flows into and through the filtration pile 188 and thereafter into the second chamber 204 and out of the gas outlet 212. In this regard, it is understood that the first chamber 200 will be at a greater pressure than the second chamber 204.

The first embodiment of the moving granular bed filter 100 additionally includes a gas flow direction plate 216 mounted on the vessel 104 and disposed within the filtration pile 188 that directs the gas stream to flow downward into the filtration pile 188 on one side of the gas flow direction plate 216, and subsequently to flow upward through the filtration pile 188 on the opposite side of the gas flow direction plate 216 as the gas stream travels from the first chamber 200 to the second chamber 204. The gas flow direction plate 216 extend between the opposite regions of the wall structure 116 in a fashion similar to the first and second media direction plates 172 and 176, and is preferably tightly connected with the wall structure 116 to avoid leakage of the gas stream past the edges of the gas flow direction plate 216. It is preferred that such leakage is avoided in order to ensure that the gas stream flows into the filtration pile 188 and around the gas flow direction plate 216 in the direction indicated by the arrows 112 to maximize the filtration effect of the granular media 108. The gas flow direction plate 216 preferably also extends vertically upward and into the media delivery channel 148 for reasons set forth more fully below. The flowing of the contaminant-laden gas stream through the filtration pile 188 of the granular media 108, captures at least a portion of the contaminants from the gas stream, with the captured contaminants thereafter being carried by the granular media 108.

In operation of the moving granular bed filter 100, the granular media 108 moves through the vessel 104 substantially contemporaneously with the flow of the gas stream 112 between the gas inlet 208 and the gas outlet 212. More specifically, sufficient quantities of the granular media 108 are employed to provide the filtration pile 188 extending between the valve 152 and the media inlet 184 and to provide the delivery pile 196 above and in communication with the filtration pile 188. Operation of the valve 152 removes the granular media 108 at a given rate from the vessel 104, with replacement granular media 108 being delivered to the filtration pile 188 from the delivery pile 196. Operation of the valve 152 thus permits the granular media 108 of the filtration pile 188 to be gradually replaced at a rate appropriate to the quantity of contaminants that are required to be removed from the gas stream.

The valve 152 can be any of a wide variety of known material control devices such as rotary feed valves, rotary screw conveyors, and other such devices. The valve 152 can either be operated continuously or periodically, and operation of the valve delivers quantities of the granular media 108 (or passes the granular media 108 at a given rate) to the media transport system 156. It is thus understood that the valve 152 provides a media outlet 220 that is in communication with the interior 128 as well as the exterior of the vessel 104.

In gradually replacing the filtration pile 188, it can be seen that the granular media 108 flows in a vertically downward direction from the hopper 144, out of the media inlet 184, and into the filtration pile 188 while flowing past the gas flow direction plate 216. In this regard, it is preferred that the gas flow direction plate 216 be oriented in a direction substantially parallel with the flow of the granular media 108 from the media inlet 184 to the media outlet 220.

As indicated hereinbefore, the gas stream having the contaminants entrained therein flows into the gas inlet 208 and thus into the first chamber 200 where it flows downward into the filtration pile 188, past the lowest edge of the gas flow direction plate 216, and then back upward through the filtration pile 188 and into the second chamber 204, after which it flows out of the gas outlet 212. Since the granular media 108 flows in a direction generally vertically downward from the media inlet 184 toward the media outlet 220 during operation of the valve 152, the flow of the gas stream from the first chamber 200 in a direction vertically downward into the filtration pile 188 on the first side of the gas flow direction plate 216 can be said to be in a direction "concurrent" with the movement of the granular media 108. Similarly, the flow of the gas stream in a direction generally upward on the second side of the gas flow direction plate 216 from the filtration pile 188 into the second chamber 204 can be considered "counter-current" with the downward flow of the granular media 108. While the concurrent flow of the gas stream and the granular media 108 removes a certain quantity of the contaminants from the gas stream into the granular media 108, the additional counter-current flow of the gas stream with the granular media 108 advantageously provides an additional mechanism for removal of the contaminants from the gas stream by providing a different interaction between the gas stream and the granular media 108. Such count-current flow advantageously serves to remove additional contaminants from the gas stream that were not removed during the concurrent flow of the gas stream and the granular media 108.

In this regard, the gas flow direction plate 216 advantageously increases the path through which the gas stream 112 travels through the filtration pile 188, and additionally facilitates the combined concurrent and counter-current flow phenomena by forcing the gas stream to initially flow vertically downward into the filtration pile 188 during travel of the gas stream between the first and second chambers 200 and 204. The gas flow direction plate 216 preferably extends vertically upward through the media inlet 184 and into the media delivery channel 148 to resist the gas stream from flowing upward into the media delivery channel 148 and through the delivery pile 196, instead of flowing through the filtration pile 188. The extent to which the gas flow direction plate 216 extends vertically upward into the media delivery channel depends upon the specific granular media 108 being used, the flow rate of the gas stream 112 and the granular media 108, and the size of the media inlet 184, as well as other factors. In this regard, while a small proportion of the gas stream 112 potentially could acceptably flow above the gas flow direction plate 216 in such a fashion, the far greater proportion of the gas stream 112 flows in the direction indicated by the arrows 112 in FIG. 1. It is understood that the gas flow direction plate 216 can be of configurations others than that shown in FIGS. 1 and 2 without departing from the concept of the present invention.

It is also understood that since the moving granular bed filter 100 provides both concurrent and counter-current flow between the gas stream 112 and the granular media 108, it is possible to configure the media delivery channel 148 to provide a filtration pile 188 that provides lesser or greater proportions of concurrent and counter-current flow depending upon the specific needs of the particular application. For instance, if the first media direction plate 172 of the media delivery channel 148 extends only half as far into the interior 128 of the vessel 104 as the second media direction plate 176, the upper surface 192 of the filtration pile 188 will still remain at the same angle of repose on both sides of the media inlet 184, but the height of the filtration pile 188 will be relatively higher on the side controlled by the fist media direction plate 172 than the side controlled by the second media direction plate 176. In such a configuration, the gas stream would undergo a longer path of concurrent travel than counter-current travel since the height of the filtration pile 188 with respect to the gas flow direction plate 216 would be greater on the concurrent side of the gas flow direction plate 216 than the counter-side thereof. In alternate embodiments, it may even be possible to completely eliminate the first and second media direction plates 172 and 176 with the media inlet 184 being formed in the roof 120 without departing from the concept of the present invention.

The moving granular bed filter 100 can be used with numerous types of gas streams having numerous types of contaminants entrained therein. For instance, the moving granular bed filter 100 can be employed to remove fly ash from an exhaust gas stream of a coal-fired powerplant. In such an application, the granular media 108 may be gravel, sand, pelletized fly ash, or other appropriate material. Additionally, if the gas stream is an exhaust gas stream from a coal-fired powerplant, but it is desired to remove sulfur dioxide gas from the gas stream, the granular media 108 may be preferred to be a combination of limestone and dolomite, whereby the granular media will capture the sulfur dioxide from the gas stream by combining with it to form calcium sulfate. In such an application, the media cleaning system 160 may regenerate the calcium sulfate and return the granular media 108 to substantially its original condition for return to the hopper 144. In other applications, the calcium sulfate may simply be discarded.

It is also understood, however, that the moving granular bed filter 100 may be advantageously configured to remove both sulfur dioxide and fly ash during a single pass of the gas stream 112 through the vessel 104, such as when the granular media 108 is a mixture of limestone and dolomite, with the granular media 108 both capturing the fly ash and combining with the sulfur dioxide to form calcium sulfate. In such a configuration, the media cleaning system 160 may include both a sieving mechanism to remove the fly ash from the calcium sulfate and a regeneration system to regenerate the calcium sulfate. Alternatively, if the gas stream comes from a fluidized bed and thus is carrying particulate catalyst material or other material, the granular media 108 may be a different appropriate material. Still alternatively, the moving granular bed filter 100 can be used in a catalytic application in which catalyst materials are entrained in petroleum vapors and are removed therefrom by other appropriate granular media.

It can thus be seen that the moving granular bed filter 100 of the present invention can be used in numerous types of applications. Other applications for the moving granular bed filter 100 will be apparent to those knowledgeable in the relevant art. It can further be seen that the media cleaning system 160 may be any of a variety of systems that are suited to removing particular contaminants from particular granular media 108. While various granular media 108 may be employed, it is preferred that the granular media be of a size approximately in the range of ¼ inch to ½ inch in diameter in order to keep the pressure drop experienced by the gas stream 112 in flowing through the filtration pile 188 at a relatively low level. In this regard, it may be desirable for smaller or larger particles to be employed without concern for the resulting pressure drop depending upon the specific needs of the particular application. It is also understood that the specific granular media may be selected according to the temperature at which the moving granular bed filter 100 will be operated.

The flow rate of the granular media 108 typically corresponds with the flow rate of the gas stream 112, the concentration of contaminants in the gas stream 112, and the ability of the granular media 108 to capture the contaminant from the gas stream 112. In general, the flow rate of the granular media will be in approximately the range of 10–20 times the contaminant load supplied by the gas stream 112. For instance, if the flow rate of the gas stream 112 is such that five pounds of the contaminant are carried per minute into the vessel 104 by the gas stream 112, the flow rate of the granular media may be in approximately the range of 50–100 pounds per minute, depending upon the factors set forth above, to achieve substantial capture of the contaminant.

In this regard, it is understood that the flow rate of the granular media 108 will be based at least partially upon economic factors, such as the increased material handling costs of employing increased flow rates for the granular media 108, and the economic result of capturing the contaminant from the gas stream 112 such as compliance with applicable pollution regulations and reusing or selling the captured contaminant. It is further understood that low flow rates may adversely affect the operability and the collection efficiency of the moving granular bed filter 100 due to potential over-concentration of the contaminant within the granular media 108, which may limit the ability of the granular media 108 to capture additional quantities of the contaminant without being cleaned or regenerated. Such low flow rates may additionally result in "channeling" of the granular media 108 through the vessel 104 whereby regions of the filtration pile 188 may cease to circulate or may circulate less frequently than other regions of the filtration pile 188 through the granular media delivery system 132. It thus is understood that the flow rate of the granular media 108 through the vessel 104 is preferably optimized in accordance with various considerations.

The modular nature of the moving granular bed filter 100 permits a plurality of the moving granular bed filters 100 to be arranged in a series and/or parallel configuration whereby the gas stream may flow into a first moving granular bed filter 100 to remove a first quantity of a given contaminant and then flow into a second moving granular bed filter 100 to remove an additional amount of the contaminant or to remove a different contaminant from the gas stream. An example of such a configuration would include the exhaust stream from a coal-fired powerplant which travels through a first moving granular bed filter 100 to remove a substantial part of the fly ash entrained in the gas stream, and thereafter flows into a second moving granular bed filter that removes an additional quantity of the fly ash from the gas stream, and subsequently flows into a third moving granular bed filter that removes sulfur dioxide from the stream. As indicated hereinbefore, however, the capture of the fly ash and sulfur dioxide may occur simultaneously in a single pass through the moving granular bed filter 100 depending upon the granular media 108 employed. Other arrangements will be apparent to those skilled in the relevant art. While it is most preferred that each moving granular bed filter employ its own granular media delivery system 132 for purposes of keeping each moving granular bed filter 100 as a unitary mechanism, it may be possible in specific applications for a plurality of vessels 104 to together employ a single granular media delivery system 132 depending upon the specific needs of the particular application.

The relatively simple configuration of the moving granular bed filter 100 of the present invention permits the vessel 104 to be constructive primarily from plates and channel or angle members without the need for special fabrication other than welding or other attachment methodologies, and the present device thus can be manufactured relatively inexpensively. Moreover, if the vessel 104 is manufactured out of steel or other materials that can withstand moderate amounts of heat, the moving granular bed filter 100 can be employed in a high temperature application without a meaningful concern of damage to the system.

It is also understood that the moving granular bed filter 100 can be employed in low temperature applications that preferably are above the dew point for any vapors that may be present in the gas stream or in the immediate atmosphere. As is known in the relevant art, operation at temperatures below the dew point may result in condensation of water or other liquids into the granular media 108, which resultantly impairs the ability of the granular media delivery system 132 to transport the granular media 108.

Figure 3:
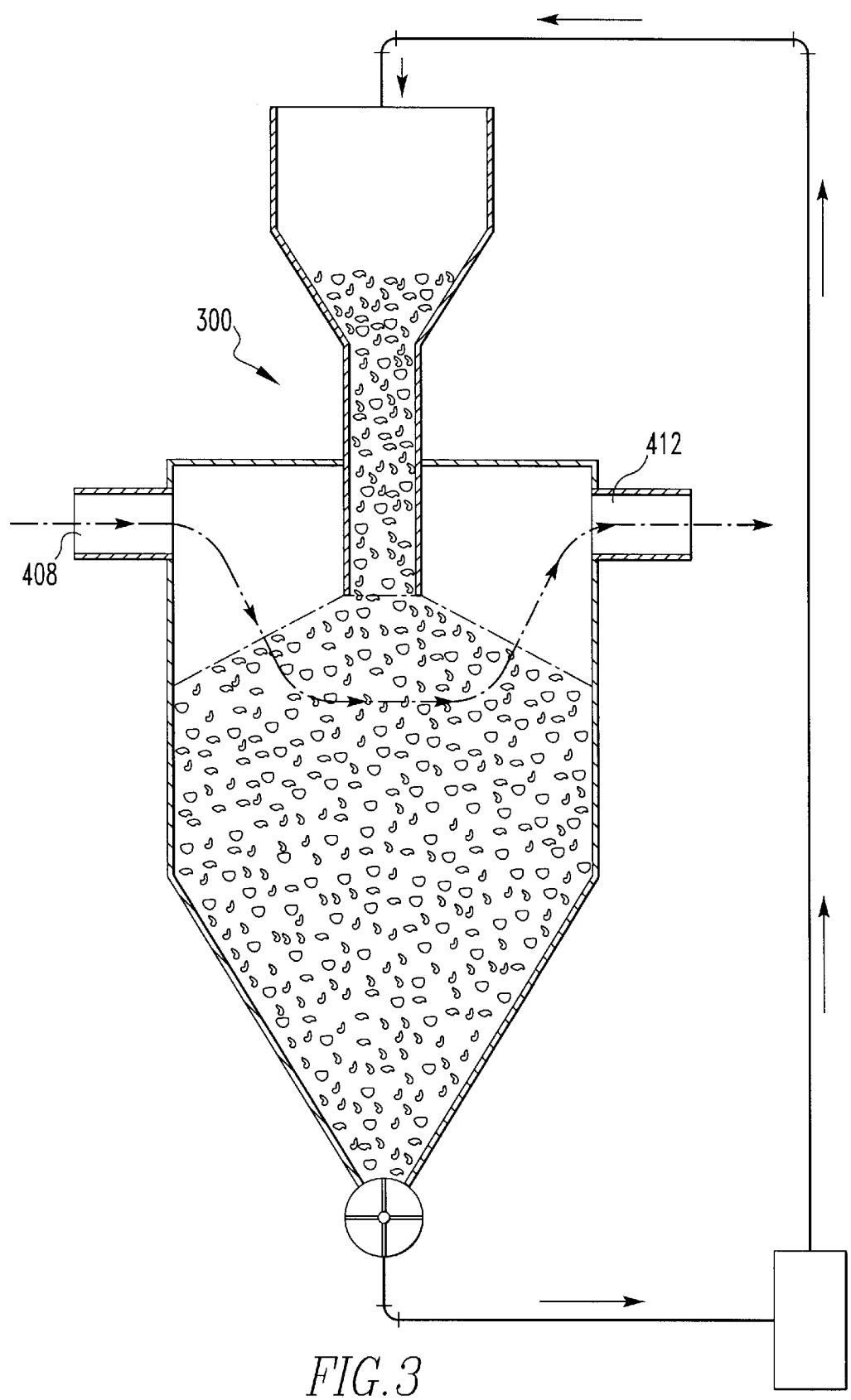
FIG. 3 is a view similar to FIG. 1, except depicting a second embodiment of a moving granular bed filter in accordance with the present invention.

A second embodiment of a moving granular bed filter 300 is indicated generally in FIG. 3. The moving granular bed filter 300 is similar to the moving granular bed 100, except that the moving granular bed filter 300 does not include the gas flow direction plate 216. The moving granular bed filter 300 thus may be employed in less critical filtration applications where the need for both concurrent and counter-current flow is less critical.

While the moving granular bed filter 300 accomplishes both concurrent and counter-current flow between the gas stream and the granular media 108, the absence of the gas flow direction plate 216 both reduces the pressure drop between the gas inlet 408 and the gas outlet 412 and additionally results in at least a nominally reduced counter-flow mechanism. It is understood, however, that the configuration of the filtration pile 188 can be altered in the moving granular bed filter 300 to achieve desired proportions of concurrent and counter-current flow.

It is further understood that the flow of the gas stream through different regions of the filtration pile is self-regulating as a function of the pressure drop across the different regions of the filtration pile. As an example, regions of the filtration pile having the shortest path between the gas inlet and gas outlet 408 and 412 will initially provide the least pressure drop to the gas stream in flowing between the gas inlet and gas outlet 408 and 412, and thus the gas stream will initially flow across this given path. If the contaminant being removed from the gas stream is fly ash, for example, continued flow of the gas stream across the given path will result in the capture of progressively additional quantities of the fly ash by the granular media along the given path, with the captured fly ash resultingly increasing the pressure drop across the given path. As such, the gas stream will naturally find and flow across different regions of the filtration pile having the lowest pressure drops, with corresponding progressive increases in the pressure drops occurring across these regions due to the capture of the fly ash, such that the gas stream will find further regions of the filtration pile having relatively lower pressure drops across which to flow. As such, the flow of the gas stream across different regions of the filtration pile is self-regulating as a function of varying pressure drops across the different regions of the filtration pile due to the capture of the contaminant.

Figure 4:
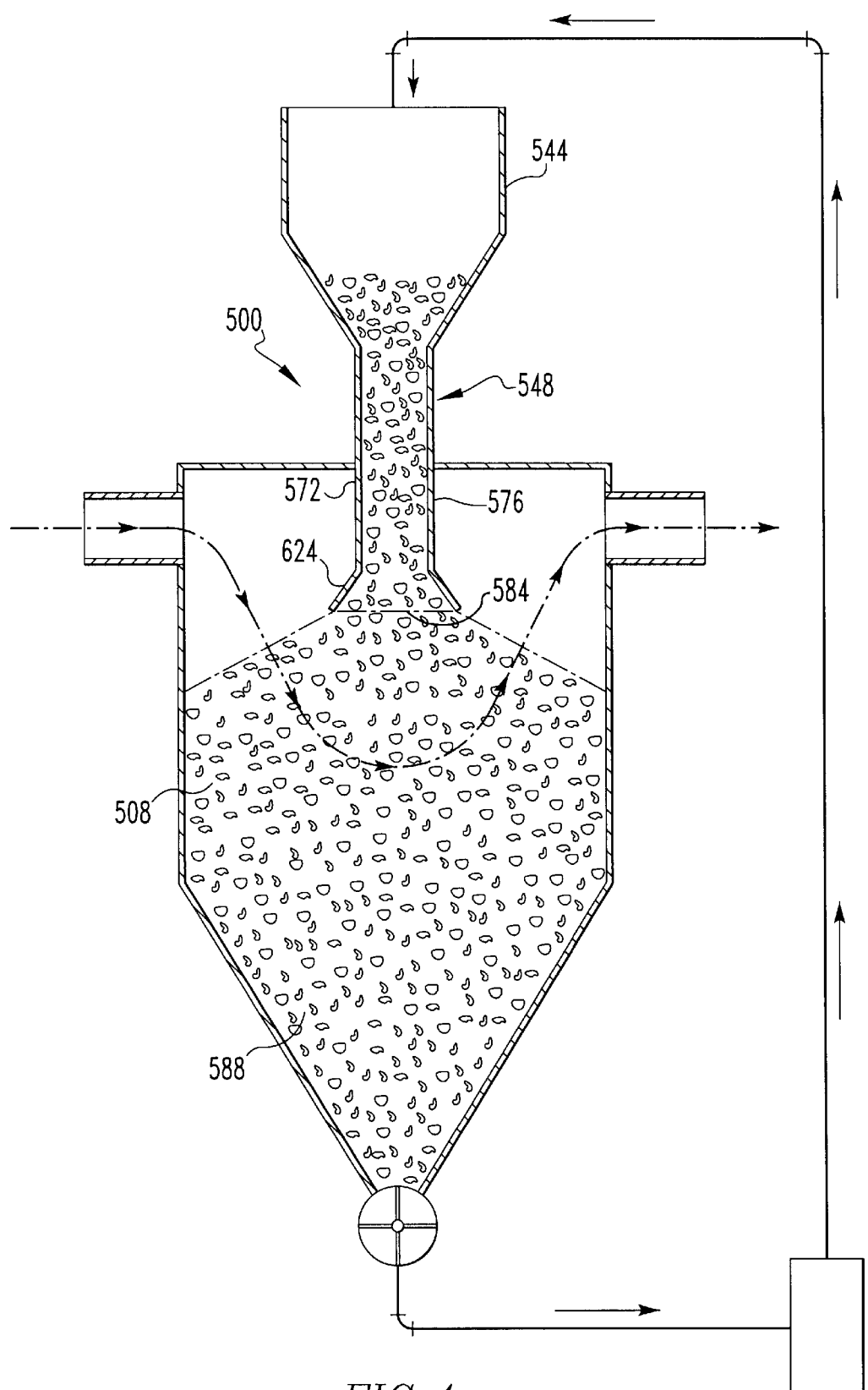
FIG. 4 is a view similar to FIG. 3, except depicting a third embodiment of a moving granular bed filter in accordance with the present invention.

A third embodiment of a moving granular bed filter 500 is indicated generally in FIG. 4. The moving granular bed filter 500 is similar to the moving granular bed 300 but additionally includes a flared skirt 624 at the end of the media delivery channel 548 opposite the hopper 544 that form the media inlet 584. In this regard, it can be seen that the first and second media direction plates 572 and 576 each include a tip that is angled away from the other to together form the flared skirt 624. From the foregoing, it is understood that the angle of the skirt 624 with respect to the horizontal must be steeper than the angle of repose of the granular media 508 to ensure that the skirt 624 remains in contact with the filtration pile 588.

As can be understood from FIG. 4, the skirt 624 has the effect of widening the media inlet 584 as compared with that of the moving granular bed filter 300 such that the shortest path through the filtration pile 588 that can be traveled by the gas stream is relatively longer than in the moving granular bed filter 300. The moving granular bed 500 with its flared skirt 624 thus may be used in applications where filtration needs are less critical than that requiring the moving granular bed filter 100, yet more critical than those requiring the moving granular bed filter 300. Again, the flow of the gas stream across the filtration pile is self-regulating.

While a number of particular embodiments of the present invention have been described herein, it is understood that various changes, additions, modifications, and adaptations may be made without departing from the scope of the present invention, as set forth in the following claims.

What is claimed is:

1. A moving granular bed filter for removing contaminants from a gas stream with a quantity of granular media, the moving granular bed filter comprising:

a vessel having a wall structure and being formed with a hollow interior, the vessel including a gas inlet, a gas outlet, a media inlet, and a media outlet in communication with the interior;

the media inlet extending between a pair of opposed regions of the wall structure and being structured to supply the granular media to the interior of the vessel;

the ganular media being in a freely-formed filtration pile within the interior of the vessel, the filtration pile having an upper surface, the filtration pile extending between the media inlet and the media outlet and extending between the pair of opposed regions of the wall structure to define a first chamber and a second chamber within the interior, the first and second chambers each extending from the upper surface of the filtration pile;

the first chamber extending between the media inlet and the wall structure;

the second chamber extending between the media inlet and the wall structure; and the gas inlet being in communication with the first chamber, the gas outlet being in communication with the second chamber, and the filtration pile of granular media being operatively interposed between the first and second chambers.

2. The moving granular bed filter as set forth in claim 1, in which the media inlet includes a gas flow direction plate extending between the pair of opposed regions of the wall structure and extending downwardly into the filtration pile of granular media.

3. The moving granular bed filter as set forth in claim 2, in which the vessel includes a media delivery channel extending vertically upwardly from the media inlet and being structured to supply the granular media to the media inlet, in which at least a portion of the gas flow direction plate extends into the media delivery channel, and in which the granular media further forms a delivery pile in communication with the filtration pile and extending vertically upwardly from the media inlet through the media delivery channel.

4. The moving granular bed filter as set forth in claim 3, in which at least a portion of the media delivery channel extends into the interior of the vessel, and in which the media delivery channel includes a first media direction plate within the interior of the vessel extending between the pair of opposed regions of the wall structure, with one of the first and second chambers extending between the first media direction plate and the wall structure.

5. The moving granular bed filter as set forth in claim 4, in which the media delivery channel includes a second media direction plate within the interior of the vessel extending between the pair of opposed regions of the wall structure, the other of the first and second chambers extending between the second media direction plate and the wall structure, the gas flow direction plate extending between the first and second media direction plates.

6. The moving granular bed filter as set forth in claim 1, in which the vessel includes a roof connected with the wall structure, and further includes a media delivery channel extending between roof and the media inlet and extending between the pair of opposed regions of the wall structure, the media delivery channel being structured to supply the granular media to the media inlet, and in which the granular media further forms a delivery pile in communication with the filtration pile and extending vertically upwardly from the media inlet through the media delivery channel.

7. The moving granular bed filter as set forth in claim 6, in which the media inlet includes a gas flow direction plate extending between the pair of opposed regions of the wall structure and extending from within the media delivery channel downwardly into the filtration pile of granular media.

8. The moving granular bed filter as set forth in claim 6, in which the media delivery channel includes a flared skirt that forms the media inlet.

9. The moving granular bed filter as set forth in claim 6, in which the media outlet includes a valve structured to withdraw the granular media from the interior of the vessel, the media inlet being structured to supply granular media to the interior of the vessel corresponding with the granular media withdrawn by the valve.

10. A moving granular bed filter for removing contaminants from a gas stream with a quantity of granular media, the moving granular bed filter comprising:

a vessel having a wall structure and a roof connected with one another, the vessel being formed with a hollow interior defined between the wall structure and the roof, the vessel including a gas inlet, a gas outlet, a media inlet, and a media outlet in communication with the interior;

the vessel further including a media delivery channel extending partially into the interior of the vessel and terminating at the media inlet, the media delivery channel including a first media direction plate and a second media direction plate that each extend between a pair of opposed regions of the wall structure, the media inlet being structured to supply the granular media from the media delivery channel to the interior of the vessel to form a freely-formed filtration pile within the interior of the vessel, the filtration pile having an upper surface and extending between the media inlet and the media outlet and between the pair of opposed regions of the wall structure to define a first chamber and a second chamber within the interior, the first and second chambers each extending from the upper surface of the filtration pile;

the first chamber extending between the first media direction plate and the wall structure;

the second chamber extending between the second media direction plate and the wall structure; and the gas inlet being in communication with the first chamber, the gas outlet being in communication with the second chamber, and the filtration pile of granular media being operatively interposed between the first and second chambers.

11. The moving granular bed filter as set forth in claim 10, in which the vessel includes a gas flow direction plate extending between the pair of opposed regions of the wall structure, the gas flow direction plate having an upper end disposed within the media delivery channel and having a lower end disposed outside the media delivery channel and below the media inlet.

12. The moving granular bed filter as set forth in claim 10, in which the media delivery channel includes a flared skirt that terminates at the media inlet.

13. The moving granular bed filter as set forth in claim 10, in which the media outlet includes a valve structured to withdraw the granular media from the interior of the vessel, the media inlet being structured to supply granular media to the interior of the vessel corresponding with the granular media withdrawn by the valve.

14. A method of removing contaminants from a gas stream using a quantity of granular media within a moving granular bed filter, the method comprising the steps of:

maintaining a freely-formed filtration pile of the granular media within the interior of a vessel of the moving granular bed filter, the filtration pile extending between a pair of opposed regions of a wall structure of the vessel and between a media inlet and a media outlet to define first and second chambers within the interior of the vessel that each extend upwardly from the upper surface of the filtration pile between the media inlet and the wall structure, the media inlet and the media outlet being in communication with the exterior of the vessel;

flowing the gas stream including the contaminants from the exterior of the vessel through a gas inlet into the first chamber, passing the gas stream through the filtration pile to remove at least a portion of the contaminants from the gas stream; and discharging the gas stream into the second chamber and through a gas outlet to the exterior of the vessel.

15. The method as set forth in claim 14, in which the step of maintaining a freely-formed filtration pile includes the steps of withdrawing the granular media through the media outlet from the filtration pile at a given rate and delivering granular media through the media inlet into the vessel at the given rate to replace the granular media removed through the media outlet.

16. The method as set forth in claim 15, in which the step of passing the gas stream through the filtration pile includes the steps of moving the gas in a direction concurrent with the flow of granular media between the media inlet and the media outlet and moving the gas in a direction counter-current with the flow of granular media between the media inlet and the media outlet.

17. The method as set forth in claim 16, in which the step of maintaining a freely-formed filtration pile further includes the step of maintaining a delivery pile of the granular media in communication with the filtration pile, the delivery pile extending vertically upwardly through a media delivery channel from the media inlet.

18. The method as set forth in claim 17, in which the step of passing the gas stream through the filtration pile further includes the step of moving the gas around a gas flow direction plate extending from the media inlet into the filtration pile.

19. The method as set forth in claim 18, in which the step of moving the gas in a direction concurrent with the flow of granular media occurs on one side of the gas flow direction plate, and in which the step of moving the gas in a direction counter-current with the flow of granular media occurs on the other side of the gas flow direction plate.

20. The method as forth in claim 17, in which the step of passing the gas stream through the pile further includes the step of moving the gas around a flared skirt on the media delivery channel that forms the media inlet.

* * * * *